Aug. 14, 1923.

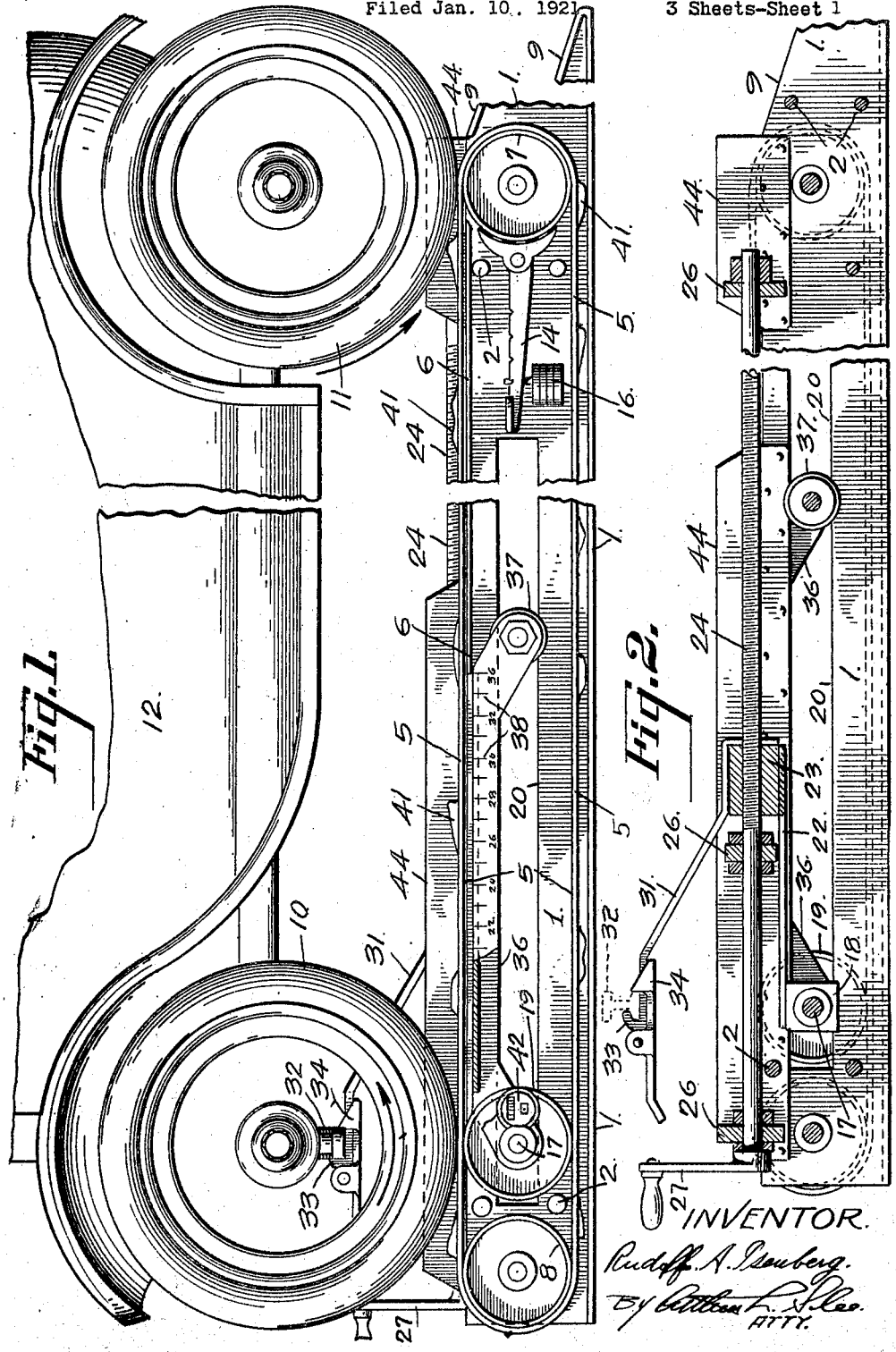

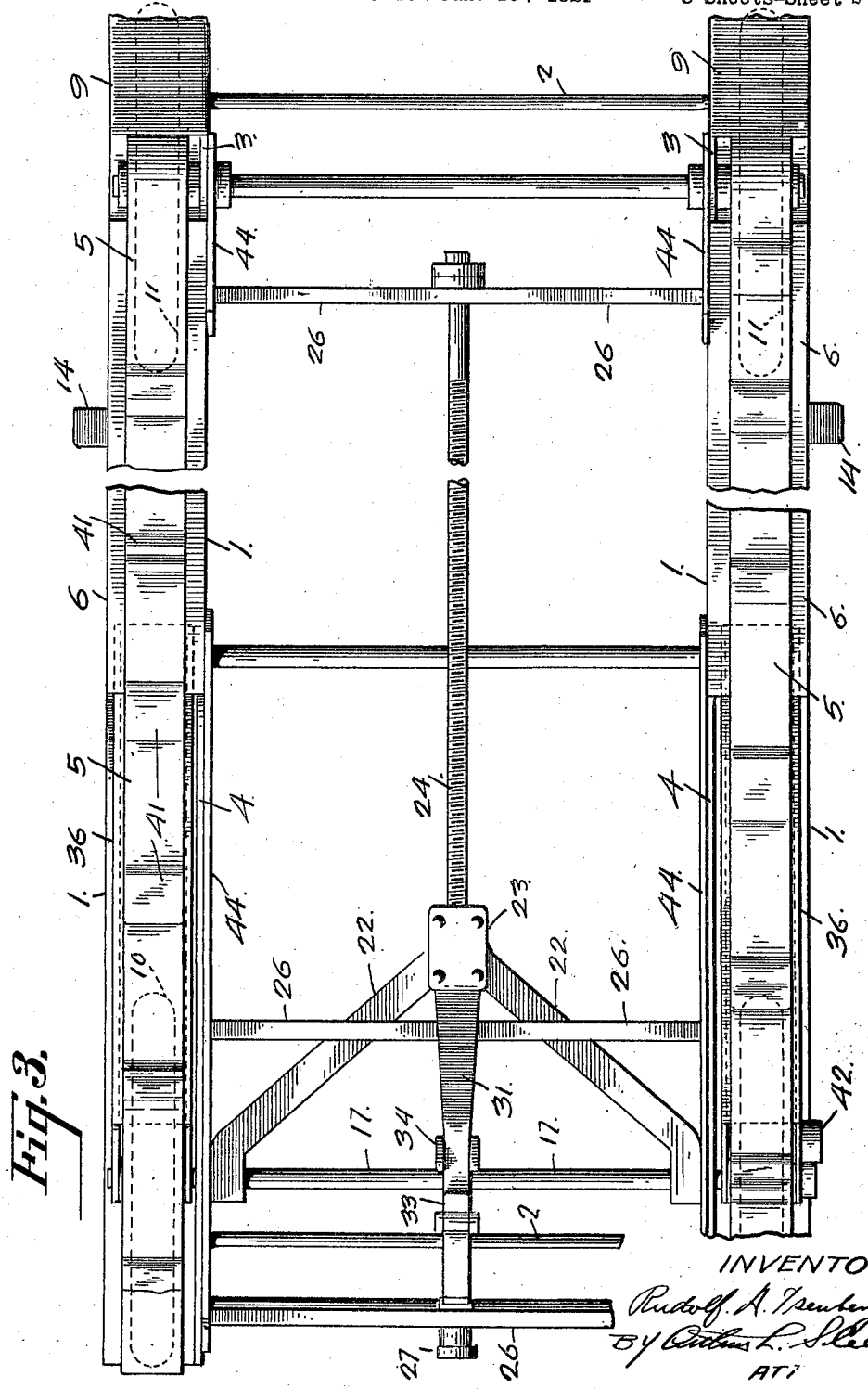

R. A. ISENBERG 1,464,763

MOTOR VEHICLE TESTING DEVICE

Filed Jan. 10, 1921    3 Sheets-Sheet 3

INVENTOR.
Rudolf A. Isenberg.
BY Arthur L. Lee.
ATTY.

Patented Aug. 14, 1923.

1,464,763

UNITED STATES PATENT OFFICE.

RUDOLF A. ISENBERG, OF SAN FRANCISCO, CALIFORNIA.

MOTOR-VEHICLE TESTING DEVICE.

Application filed January 10, 1921. Serial No. 436,322.

*To all whom it may concern:*

Be it known that I, RUDOLF A. ISENBERG, a citizen of the United States, residing in the city and county of San Francisco and State of California, have invented a new and useful Improvement in a Motor-Vehicle Testing Device, of which the following is a specification.

My invention relates to improvements in motor vehicle testing devices wherein a pair of independently rotatable and parallel tread mills operate in conjunction with a movable support for the front wheels of a vehicle and a detachable front axle engaging means to retain motor vehicles of different wheel bases in engaging relation with said tread mills whereby road or running conditions may be imparted to said vehicle while the same is stationary.

The primary object of the present invention is to impart all possible road and running conditions to a motor vehicle while the same is stationary whereby knocks, squeaks and other defects, only discernible under running conditions, may be detected.

A further object of the invention is to provide an improved device of the character described whereby running conditions may be imparted to a motor vehicle while standing in order to facilitate access to and examination of certain portions of the vehicle which are inaccessible while said vehicle is in motion on a pavement.

It is also an object of the present invention to provide a new and improved device of the character described adapted for adjustment to vehicles of different wheel bases, and of such a character that a vehicle of any wheel base may be rolled or driven onto the device by its own power.

A still further object of the present invention is to provide an improved device of the character described having new and improved means for detachably engaging the front axles of various types of cars to aline the vehicle to be tested with the device.

Another object of the invention is to provide a detachable engaging element that is flexible so as to be capable of vertical movement and thereby engage front axles of different elevations.

It is also an object to provide a new and improved device of the character described wherein a retarding effort or load may be applied to the tread mill in order to obtain the effect of a vehicle climbing a grade or to determine the pulling power.

The device is also adapted to test the equalization of the braking effort as applied to the wheels of the vehicle, as well as to check up the operation of the differential and speedometer readings.

I accomplish these and other objects by means of the improved device disclosed in the drawings forming a part of the present specification wherein like characters of reference are used to designate similar parts throughout the said specification and drawings, and in which:—

Fig. 1 is a broken side elevation of my improved testing device disclosing the lower portion of a motor vehicle mounted thereon;

Fig. 2 is a longitudinal sectional view;

Fig. 3 is a broken plan view of the device; and

Figure 4:
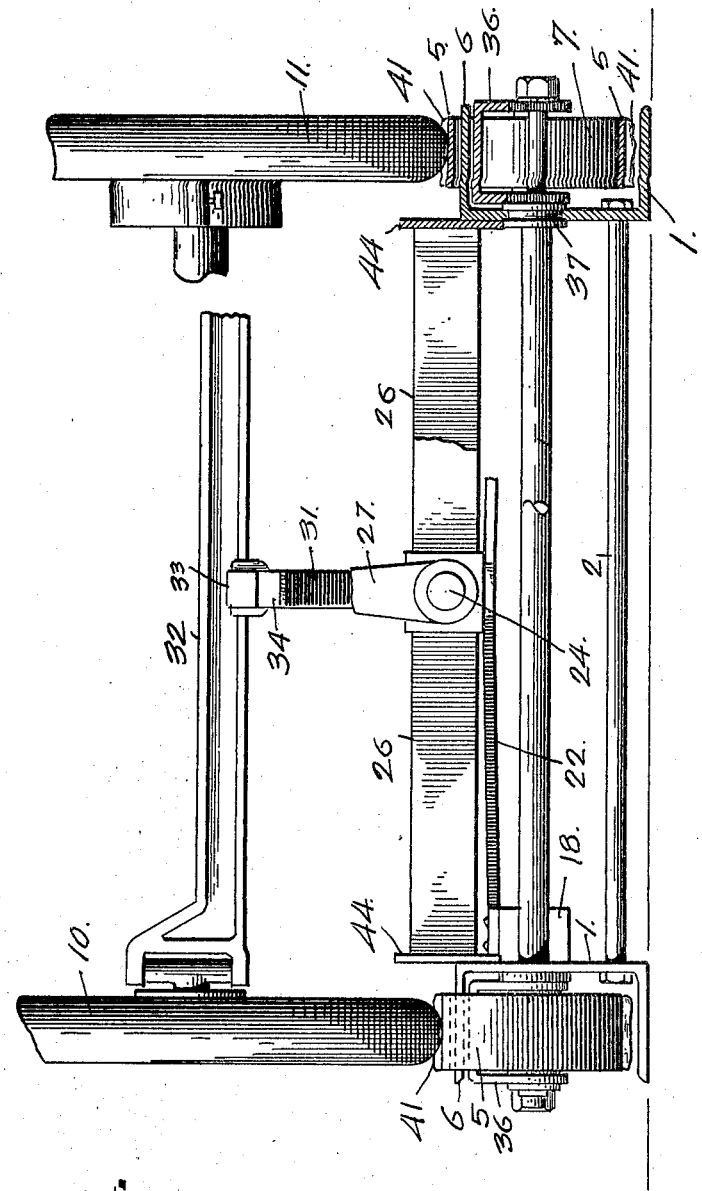
Fig. 4 is a broken front elevation, partly in section.

Referring to the drawings the numeral 1 is used to designate a pair of parallel channels rigidly connected, by means of suitable stay bolts 2, and having rear and front cut away portions 3 and 4 respectively, in the upper flanges 6 thereof.

Rotatably mounted within each channel are independently rotatable and parallel tread mills comprising endless belts 5 mounted upon independently rotatable pulleys 7 and 8 mounted in the rear and front ends respectively, of the channels 6, the upper portion of the periphery of said pulleys extending through the cut away portions 3 and 4 respectively, and slightly above the plane of the upper flange 6 of the channels 1 so that an endless belt 5 mounted upon said pulleys 7 and 8 will ride above said top flange 6 of said channels 1, the purpose of which will hereinafter be more fully set forth.

The rear end of each channel 1 is also provided with inclined portions 9 by means of which the front and rear wheels 10 and 11, respectively, of a motor vehicle 12 may ride or roll upon said tread mills by its own power or other means of propulsion.

It is understood, of course, that the distance between the centers of the endless belts 5 is equal to the standard gauge between the centers of the wheels of standard motor vehicles, so that when a motor vehicle is mounted upon the testing device the wheels on both sides of said vehicle will be engaged by said paralleled tread mills so that the wheels on one side of said vehicle may be rotated independently of the wheels on the opposite side of said vehicle.

The rear pulleys 7, in addition to being independently rotatable, are each provided with an independently operable braking lever pedal 14 graduated to receive a weight 16 by means of which a definite pressure or retarding effect may be imparted to the pulleys 7 to place a definite load upon the rear wheels 11 of the vehicle 12, said lever 14 and weight 16 constituting a scale beam.

By means of this novel arrangement the equalization of the vehicle braking mechanism may be tested by applying said braking mechanism, not shown, when the wheels 10 and 11 of the said vehicle are in motion. If one of said rear wheels stops rotating before the other, or runs at a different speed than the remaining wheel, it is evident that the braking pressure applied to said rear wheels 11 is not equal.

The rear pulleys 7 constitute independently rotatable supports for the rear wheels 1 of the vehicle 12.

To provide an adjustable rotatable support for the front wheels 10 of the vehicle 12 whereby the front wheels of vehicles of different wheel bases may be also provided with rotatable supports I have provided the transversely disposed rod or shaft 17 having bearing blocks 18 on each end thereof slidably mounted within the longitudinally disposed slots 20 within the webs of the channels 1, said shafts 17 having rotatably mounted upon each end thereof the pulleys 19 adapted to rotatably support the front wheels 10 of the vehicle 12.

The pulleys 19 are moved to a position to correspond to the wheel base of the vehicle to be tested by means of a yoke 22 secured to the slidable bearing blocks 18 and carrying a nut 23 screwed upon a threaded centrally disposed longitudinal shaft or rod 24 rotatably mounted within transverse struts 26 rigidly mounted between the channels 1.

The rod 24 is rotated by means of a suitable crank 27 secured to the front end of the threaded shaft 24. The pulleys 19 are positioned within the endless belts or tread mills 5 so that while the front wheels 10 of the vehicle actually rest upon said belts 5, the weight of said wheels is actually supported by said pulleys 19.

Secured to the nut 23 and extending forwardly to a point approximately above the center of the pulleys 19 and midway therebetween is a tongue 31 sufficiently flexible to permit of a slight vertical movement whereby the underside of front axles 32 of various and different elevations on different vehicles may be detachably engaged by means of a hook portion 33 arranged to engage the front and bottom flange of an I-beam axle 32 of a vehicle 12. A gravity latch 34 is pivotally mounted upon said tongue 31 and is arranged to operate in conjunction with the hook portion 33 to detachably engage and retain a motor vehicle 12 in a position where the front and rear wheels 10 and 11 thereof will be retained in engaging relation with the pulleys 19 and 7 respectively.

The pulleys 19, being movable longitudinally to register with the front wheels 10 of vehicles 12 of different wheel bases, are mounted within the forward cut away portion 4 of the flange 6 of the channels 1 and in order to bridge the space between said pulleys 19 and the portion of flange 6 between said space 4 and the rear pulleys 7 I have provided the channels 36 having their front ends mounted upon the ends of the shaft 17 and the rear end provided with grooved rollers 37 riding in the longitudinally disposed slot 20 in the web of the channels 1. When the front rotatable supports or pulleys 19 are fully extended, as disclosed in Figs. 1, 2 and 3 of the drawings, the channel 36 bridges the space between the front ends of the flanges 6 adjacent the cut away portions 4 and said pulleys 19 whereby the belt 5 will be supported so that the front wheels may roll over said belt and onto said pulleys 19.

When the pulleys 19 are receded to receive the front wheels 10 of a vehicle 12 having a shorter wheel base the channels 36 are receded under the flanges 6 of the channels 1, thereby providing an adjustable bridging means whereby vehicles of different wheel bases may be rolled onto the rotatable supports of the device.

By means of this novel arrangement a continuous track is provided for the front wheels 10 to ride from the rear pulleys 7 to the front pulleys 19 for vehicles of different wheel bases. The side of one channel 36 is graduated as at 38, the graduation registering with the front end of the flange 6 indicating the wheel base for which the device is set.

The belts 5 are provided with various shaped projections 41 to represent an uneven pavement or projections in a pavement, such as projecting cobblestones, street car tracks, manholes and other projections usually encountered upon a pavement. These projections contacting with the wheels of the vehicle, when in operation, produce the effect of an uneven pavement and thereby produce squeaks and other noises which it is sought to remove from the vehicle.

These projections 41 may be detachably secured by any suitable means, not shown, whereby they may be removed and the effect of an even payment thereby produced, if desired.

A speedometer 42 is also provided at any convenient point, such as connected to the front rotatable supports or pulleys 19, in Fig. 1 of the drawings, whereby the speed of the vehicle may be determined, or to check up the speedometer of said vehicle.

In operation the threaded rod 24 is rotated by the handle or crank 27 until the proper graduation 38 on the channel 36 registers with the front end of the flange 6 of the channel 1.

The vehicle 12 is then rolled, either by its own power or otherwise, up the inclines 9 of the channels 1 and over the channels 36 until the front and rear wheels 10 and 11 of the vehicle 12 rest upon the belts or tread mills 5 over the rotatable supports or pulleys 19 and 7 respectively, the brakes 14 being applied to prevent rotation of the tread mills 5 while said vehicle 12 is being positioned.

As the vehicle 12 moves forward the front axle 33 thereof will engage and depress the flexible tongue 31 and engage the hook portion 33 thereof, depressing and permitting the return of the gravity latch 34 in its progress to prevent backward movement of said vehicle and retain the wheels thereof in alignment with their rotatable supports as hereinbefore described.

The motor of the vehicle is now started and the wheels 11 caused to rotate thereby rotating the tread mills or belts 5 to produce a running condition of said vehicle while the same remains stationary upon the device, thereby facilitating examination and detection of various defects.

By placing a definite load on the rear rotatable supports or pulleys 7 a given load is placed upon the operation of the vehicle by means of which knocks may be developed to denote loose wrist pins, loose connecting rod bearings and other defects. It is also obvious that the compression of the motor to a certain extent, may be tested.

The braking mechanism of the vehicle may also be tested by application of the brakes of the vehicle as hereinbefore set forth.

After testing the vehicle it may be removed by depressing the forward end of the gravity latch 34 to release the front axle 33 and the vehicle may then be backed off of the device.

Flanges 44 are placed on the inner sides of the channels 1 to prevent lateral movement of the wheels, said flanges projecting upwardly a sufficient distance to engage the sides of the shoes of the wheels 10 and 11 to prevent tractive effort from being obtained which might run the vehicle off of the device when running at high speed and encountering one of the projections 41 which might have a tendency to bounce the vehicle laterally.

Having thus described my invention what I claim as new and desire to secure by Letters Patent is:—

1. A testing device for motor vehicles and the like comprising front and rear rotatable supports adapted for engagement with the front and rear wheels of said vehicle, said front and rear supports being movable relatively to each other, means for varying the distance between said front and rear supports whereby the wheels of vehicles of different wheel bases may be engaged; and means for bridging the space between the rear and front supports whereby a vehicle may be rolled onto the device.

2. A testing device for motor vehicles and the like comprising front and rear rotatable supports adapted for engagement with the front and rear wheels of said vehicle, said front and rear supports being movable relatively to each other, means for varying the distance between said front and rear supports whereby the wheels of vehicles of different wheel bases may be engaged; and adjustable means for bridging the space between the front and rear supports whereby a vehicle may be rolled onto said supports after the same have been set for the wheel base of said vehicle.

3. A testing device for motor vehicles and the like comprising front and rear rotatable supports adapted for engagement with the front and rear wheels of said vehicle, said front and rear supports being movable relatively to each other, means for varying the distance between said front and rear supports whereby the wheels of vehicles of different wheel bases may be engaged; adjustable means for bridging the space between the front and rear supports whereby a vehicle may be rolled onto said supports after the same have been set for the wheel base of said vehicle; and means arranged for detachable engagement with said vehicle to retain the front and rear wheels thereof in engaging relation with said supports.

4. A testing device for motor vehicles and the like comprising front and rear rotatable supports adapted for engagement with the front and rear wheels of said vehicles, said front and rear supports being movable relatively to each other, means for varying the distance between said front and rear supports whereby the wheels of vehicles of different wheel bases may be engaged; adjustable means for bridging the space between the front and rear supports whereby a vehicle may be rolled onto said supports after the same have been set for the wheel base of said vehicle; and means arranged for detachable engagement with said vehicle to retain the front and rear wheels thereof in engaging relation with said supports; and means for moving said detachable engaging means with one of the rotatable supports to position said means relatively to the wheel base of said vehicle.

5. A testing device for motor vehicles and the like comprising front and rear rotatable supports adapted for engagement with the front and rear wheels of said vehicle, said front and rear supports being movable relatively to each other, means for varying the distance between said front and rear supports whereby the wheels of vehicles of different wheel bases may be engaged; and adjustable means for bridging the space between the front and rear supports whereby a vehicle may be rolled onto said supports after the same have been set for the wheel base of said vehicle; and means for preventing lateral movement of the wheels for the supports.

6. A testing device for motor vehicles and the like comprising a pair of parallel tread mills independently movable and spaced to engage wheels on opposite sides of a motor vehicle; means for retaining said wheels in engaging relation with said tread mills; and means for preventing operation of either tread mill whereby the differential of said vehicle may be operated and tested.

7. A testing device for motor vehicles comprising a pair of parallel tread mills independently movable and spaced to engage wheels on opposite sides of said vehicle; means mounted upon said tread mills for producing an uneven road effect upon said wheels; and a movable support rotatably and movably mounted upon said tread mill for supporting the front wheels of said vehicle, whereby the wheels of vehicles of different wheel bases may be rotatably engaged and supported upon said device.

8. A testing device for motor vehicles comprising a pair of parallel tread mills independently movable and spaced to engage wheels on opposite sides of said vehicles; means mounted upon said tread mills for producing an uneven road effect upon said wheels; and a movable support rotatably and movably mounted upon said tread mill for supporting the front wheels of said vehicle, whereby the wheels of vehicles of different wheel bases may be rotatably engaged and supported upon said device; and means for bridging the distance between one end of said tread mills and said movable support whereby vehicles to be tested, and of various wheel bases, may be rolled upon said device.

9. A testing device for motor vehicles comprising a pair of parallel tread mills independently movable and spaced to engage wheels on opposite sides of said vehicles, means mounted upon said tread mills for producing an uneven road effect upon said wheels; and a movable support rotatably and movably mounted upon said tread mill for supporting the front wheels of said vehicle, whereby the wheels of vehicles of different wheel bases may be rotatably engaged and supported upon said device; and means for detachably engaging a vehicle to retain the wheels thereof in engaging relation with said tread mills and the front wheels of said vehicle in alignment with said movable support.

10. A testing device for motor vehicles comprising a pair of parallel tread mills independently movable and spaced to engage wheels on opposite sides of said vehicle; means mounted upon said tread mills for producing an uneven road effect upon said wheels; and a movable support rotatably and movably mounted upon said tread mill for supporting the front wheels of said vehicle, whereby the wheels of vehicles of different wheel bases may be rotatably engaged and supported upon said device; and means for detachably engaging a vehicle to retain the wheels thereof in engaging relation with said tread mills and the front wheels of said vehicle in alignment with said movable support; and means for moving said detachable engaging means and movable supports simultaneously to position the same in different positions relatively to and longitudinally of said tread mills whereby vehicles of different wheel bases may be engaged.

11. A testing device for motor vehicles and the like comprising a pair of parallel and oppositely faced connected channels having longitudinally disposed slots in the webs, and cut away portions in the upper flanges thereof; pulleys rotatably mounted in opposite ends of said channels, the pulleys in one channel being rotatably independently of the pulleys in the opposite channels, the upper peripheries of said pulleys extending through cut away portions in and slightly above the flanges of said channels; tread mills mounted upon said pulleys and provided with projections for producing an uneven road effect upon the wheels of a vehicle running on said tread mills; pulleys slidably and rotatably mounted in the slots of the channel and between each tread mill and arranged to support the front wheels of a vehicle thereon; means operatively connected with said last named movable pulleys and arranged to detachably engage the front axle of a vehicle on said device to retain said vehicle in engaging relation with said tread mills and movable pulleys; and means for moving the slidable pulleys and detachable engaging means longitudinally of said tread mills whereby vehicles of different wheel bases may be engaged and supported.

12. A testing device for motor vehicles and the like comprising a pair of parallel and oppositely faced connected channels having longitudinally disposed slots in the webs, and cut away portions in the upper flanges thereof; pulleys rotatably mounted in opposite ends of said channels, the pulleys in one channel being rotatably independently of the pulleys in the opposite channels, the upper peripheries of said pulleys extending through cut away portions in and slightly above the flanges of said channels; tread mills mounted upon said pulleys and provided with projections for producing an uneven road effect upon the wheels of a vehicle running on said tread mills; pulleys slidably and rotatably mounted in the slots of the channel and between each tread mill and arranged to support the front wheels of a vehicle thereon; means operatively connected with said last named movable pulleys and arranged to detachably engage the front axle of a vehicle on said device to retain said vehicle in engaging relation with said tread mills and movable pulleys; and means for moving the slidable pulleys and detachable engaging means longitudinally of said tread mills whereby vehicles of different wheel bases may be engaged and supported; and means for independently retarding rotation of either tread mill whereby a load may be placed upon the rotating effort of the wheels of the vehicle when in motion.

13. A testing device for motor vehicles and the like comprising a pair of parallel and oppositely faced connected channels having longitudinally disposed slots in the webs, and cut away portions in the upper flanges thereof; pulleys rotatably mounted in opposite ends of said channels, the pulleys in one channel being rotatably independently of the pulleys in the opposite channels, the upper peripheries of said pulleys extending through cut away portions in and slightly above the flanges of said channels; tread mills mounted upon said pulleys and provided with projections for producing an uneven road effect upon the wheels of a vehicle running on said tread mills; pulleys slidably and rotatably mounted in the slots of the channel and between each tread mill and arranged to support the front wheels of a vehicle thereon; means operatively connected with said last named movable pulleys and arranged to detachably engage the front axle of a vehicle on said device to retain said vehicle in engaging relation with said tread mills and movable pulleys; and means for moving the slidable pulleys and detachable engaging means longitudinally of said tread mills whereby vehicles of different wheel bases may be engaged and supported; and means for independently retarding rotation of either tread mill whereby a load may be placed upon the rotating effort of the wheels of the vehicle when in motion; and means for indicating and varying the degree of said retarding effort.

14. A testing device for motor vehicles comprising a pair of parallel tread mills independently rotatable and spaced to engage wheels on opposite sides of said vehicles; means mounted upon said tread mills for producing an uneven road effect upon said wheels; and a movable support rotatably and movably mounted upon said tread mill for supporting the front wheels of said vehicle, whereby the wheels of vehicles of different wheel bases may be rotatably engaged and supported upon said device; and means for bridging the distance between one end of said tread mills and said movable support whereby vehicles to be tested. and of various wheel bases, may be rolled upon said device; and flexible means for detachably engaging the front axle of a vehicle to retain the wheels of said vehicle in engaging relation with said tread mills whereby front axles of different elevations may be engaged by said engaging means.

In witness whereof I hereunto set my signature.

RUDOLF A. ISENBERG.